Aug. 11, 1931.  J. F. LEVENTHAL  1,818,410
OPTICAL APPARATUS
Original Filed Feb. 7, 1927  5 Sheets-Sheet 1
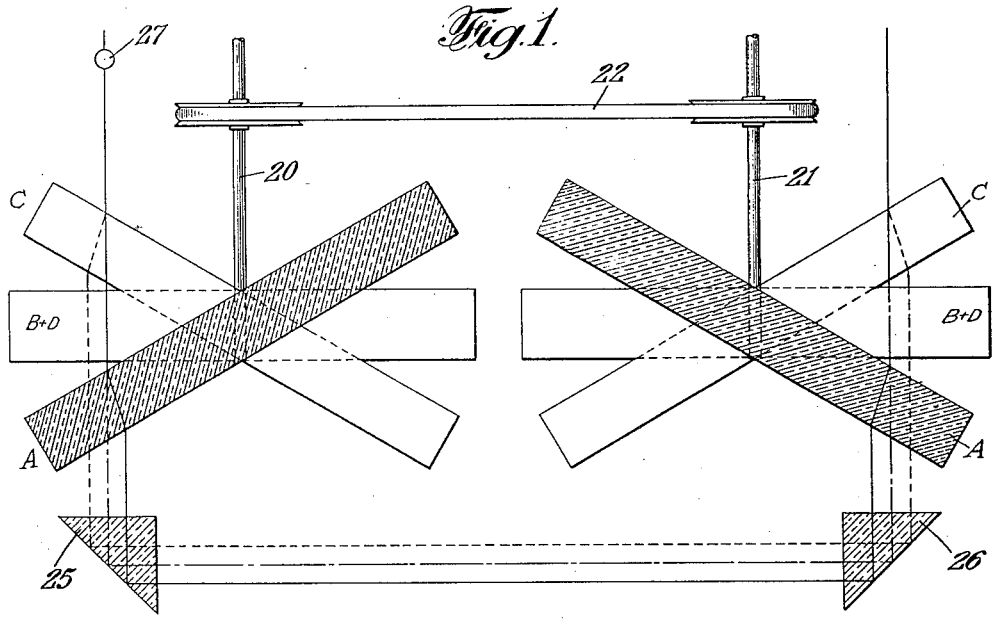
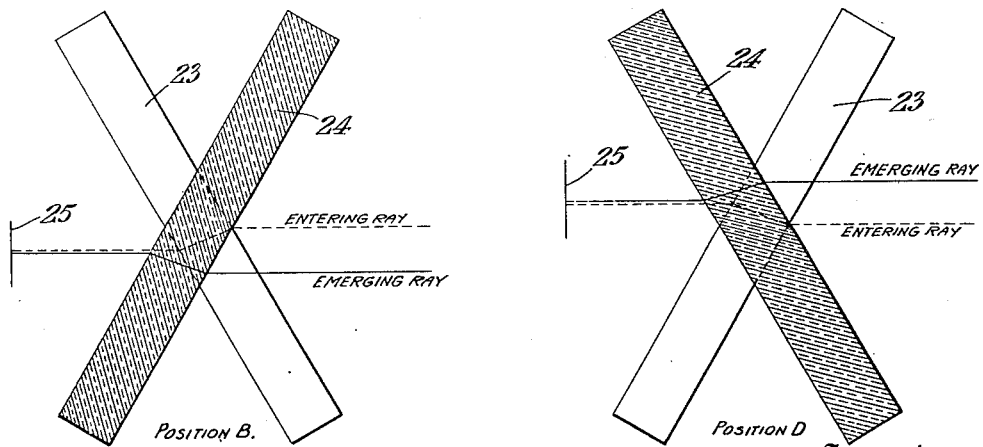
Inventor
Jacob F. Leventhal
By his Attorneys Aug. 11, 1931.　　　J. F. LEVENTHAL　　　1,818,410
OPTICAL APPARATUS
Original Filed Feb. 7, 1927　　5 Sheets-Sheet 2
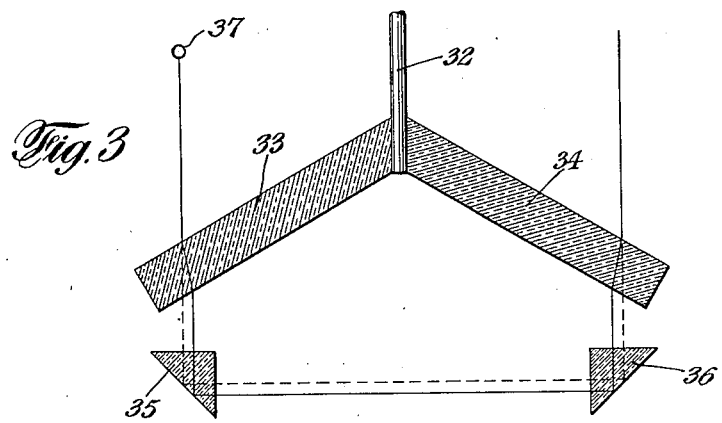
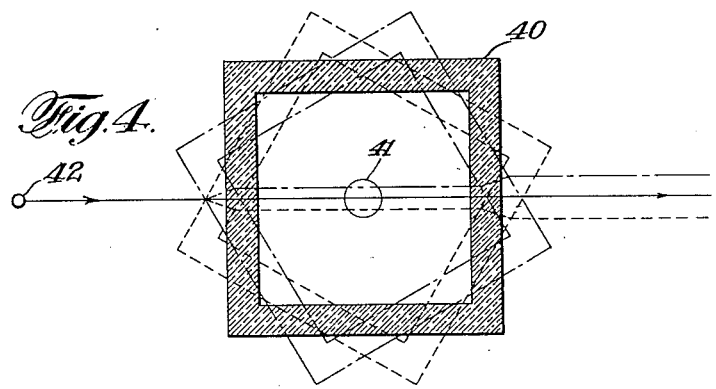
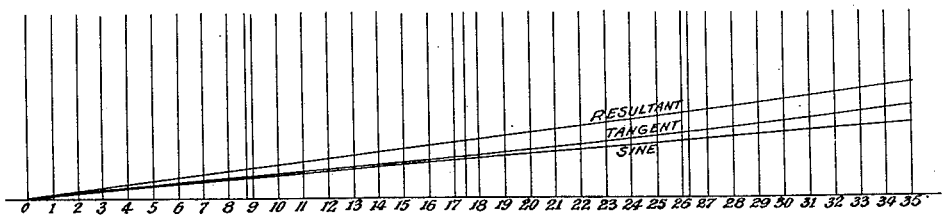

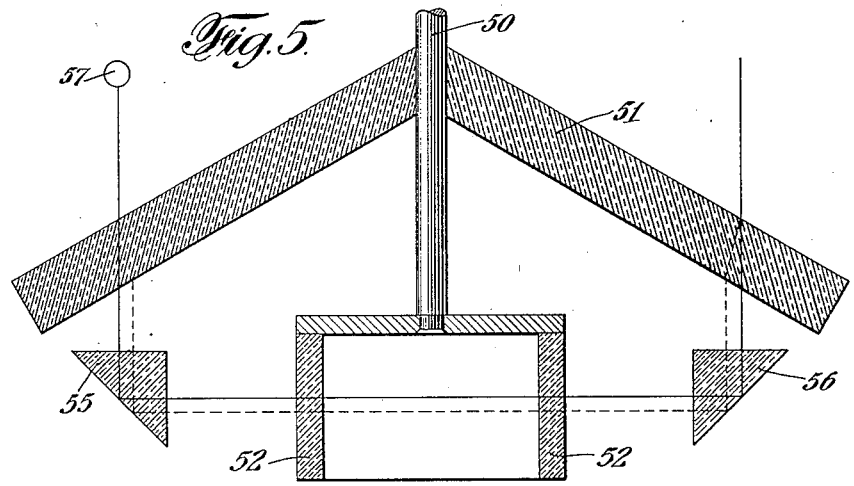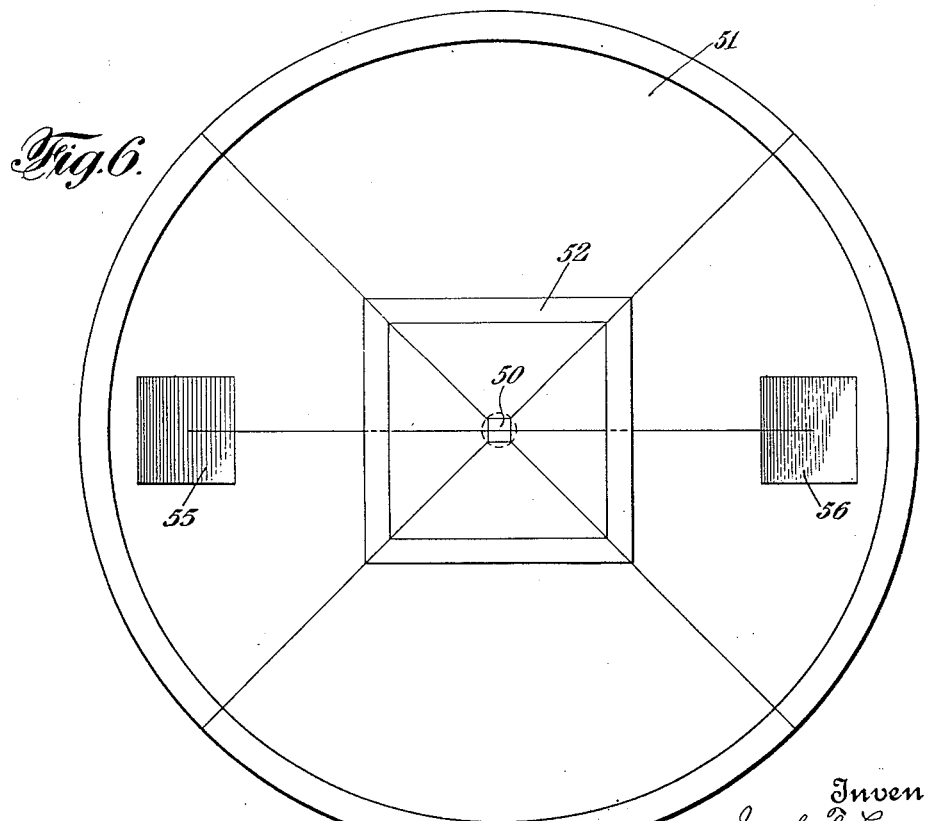

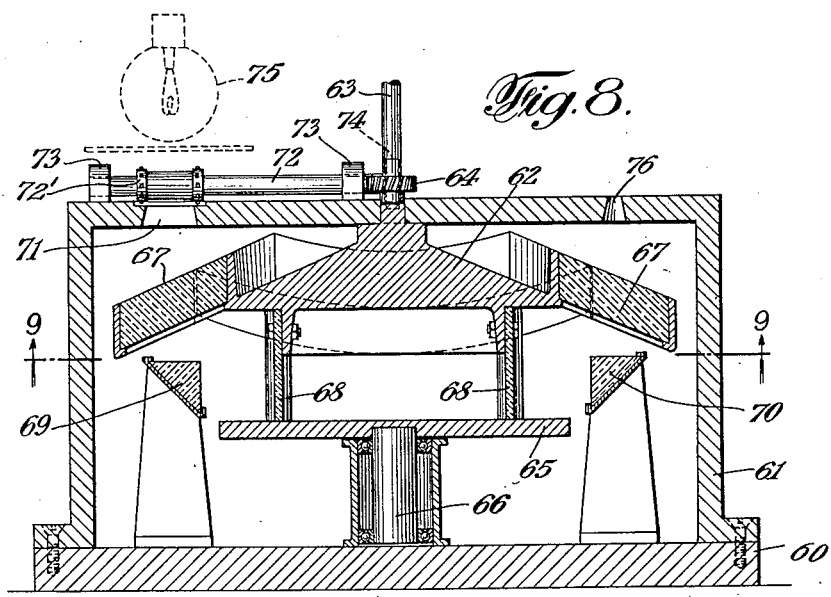
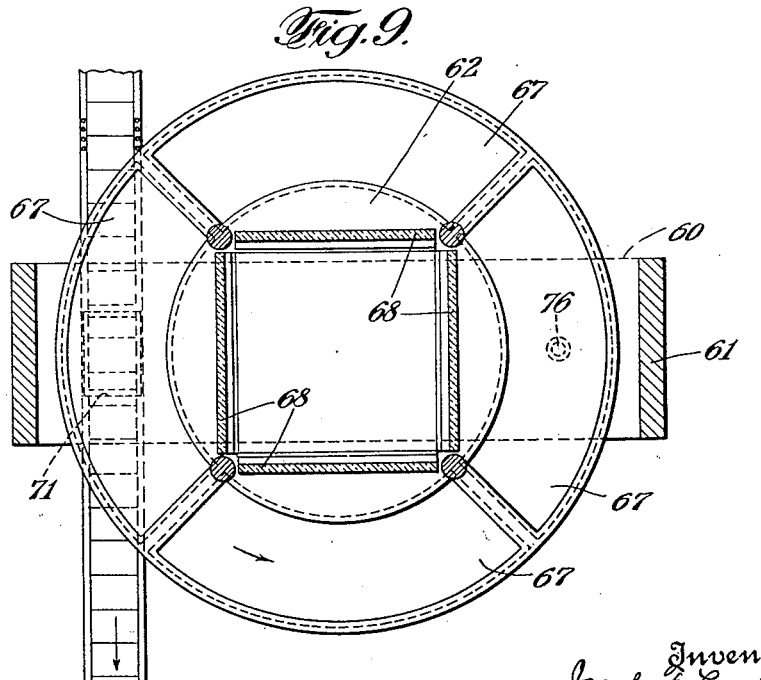

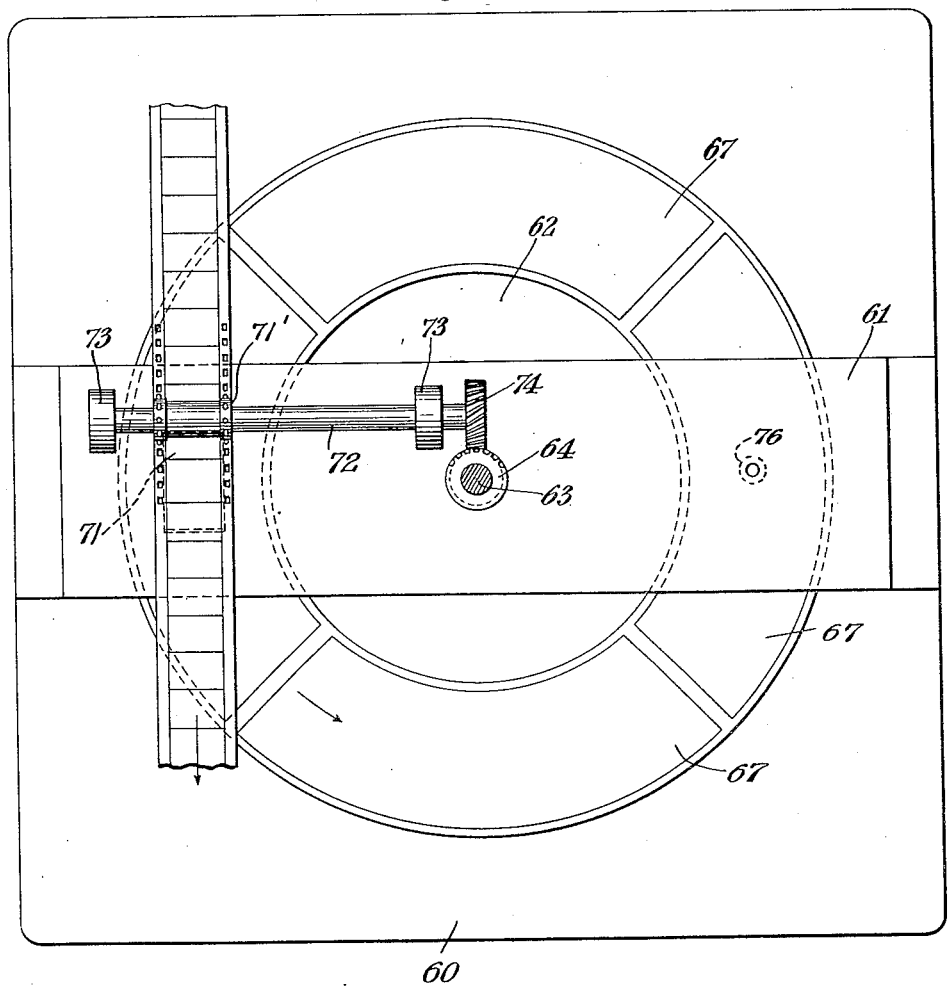

Patented Aug. 11, 1931

1,818,410

UNITED STATES PATENT OFFICE

JACOB F. LEVENTHAL, OF NEW YORK, N. Y., ASSIGNOR TO THE FIRST NATIONAL BANK OF CHATTANOOGA, TRUSTEE, OF CHATTANOOGA, TENNESSEE

OPTICAL APPARATUS

Application filed February 7, 1927, Serial No. 166,288. Renewed January 6, 1931.

This invention relates to optical apparatus and for simplicity is herein disclosed as embodied in a cinematograph film-viewing device, although it is equally well adapted to be embodied in an apparatus for projecting such films upon a screen.

An object of this invention is an optical apparatus for projecting a stationary picture from a cinematograph film steadily advanced at a uniform rate of speed.

Other objects, novel features and advantages of this invention will be apparent from the following specification and accompanying drawings, wherein Figures 1, 2, 3, 4, 5, 6 and 7 illustrate diagrammatically the principles utilized in an apparatus embodying the invention;

Fig. 8 is a vertical section through an apparatus for viewing cinematograph films;

Fig. 9 is a section taken on the line 9—9 of Fig. 8; and

Fig. 10 is a plan view of said apparatus.

In order that the invention may be easily understood, the underlying principles will be explained with reference to the diagrammatic illustrations in Figs. 1 to 7, after which a practical physical embodiment of the invention incorporating these principles which is disclosed in Figs. 8, 9 and 10 will be described.

A beam of light traversing a circular orbit may be produced by projecting a steady beam upon a light-refracting member having parallel faces, which member is mounted upon a shaft at an oblique angle to the axis thereof and rotating the shaft about its axis. For simplicity's sake, assume that the axis of the shaft is vertical and that the beam of light is projected vertically and parallel to the axis. As the refracting member is rotated, it will displace the beam of light by refraction in two directions at right angles to each other and at right angles to its axis of rotation. The displacement in these two directions, which hereafter will be referred to as the first and second direction, vary according to the sine and cosine, respectively, of the angle of rotation so that, when the displacement in the first direction is maximum, the displacement in the second direction is zero, and vice versa. As a result, the displaced beam traverses a circular orbit. The extent of displacement will depend upon the thickness of the refracting member used, its refractive index and its angle of inclination to its axis. By mounting a plurality of segmental refracting members upon a single shaft at the same inclination, a stationary beam may be converted into a succession of beams traversing a curved line which may be a half-circle, a third of a circle, a quarter of a circle or the like, depending upon the number of segments used. With this type of apparatus, each segment intercepts the stationary beam only through a portion of its rotation sufficient to cause displacement of the beam over a portion of a circle.

This principal may be made use of to convert a stationary beam into a beam moving back and forth along a straight line or into a succession of beams moving along a straight line in the same direction. Figs. 1, 2 and 3 represent diagrammatically an apparatus for utilizing this principle in such manner. A pair of vertically-arranged shafts 20 and 21 are arranged to be rotated in unison in the same direction by any suitable means such, for example, as a belt, chain or the like 22. Upon these members are mounted parallel-faced light-refracting members 23 and 24 which are inclined to the shafts 20 and 21 at the same inclination. These members are so related to each other that their corresponding angles of inclination in the same plane or parallel planes are supplementary. Totally reflecting prisms 25 and 26 are arranged below the members 23 and 24 to reflect a beam transmitted through the member 23 on to the member 24 in a direction opposite and parallel to the direction at which the beam meets the member 23. 27 represents a source of light from which a beam of light is projected parallel to the axes of rotation of the members 23 and 24 and lying in the same plane therewith. Upon rotation of the members 23 and 24, the beam of light is converted by the member 23 into a beam traversing a circular orbit and which is reflected by the prisms 25 and 26 on to the opposite face of the member 24. Because of the relationship of the two refracting members 23 and 24, the displacement effected by the refracting member 23 in one direction is exactly counteracted by that accomplished by the refracting member 24, whereas the displacement in the second direction accomplished by the refracting member 24 doubles the displacement accomplished by the refracting member 23 in that same direction.

This effect will be evident from a consideration of Figs. 1 and 2. In Fig. 1 are disclosed vertical sections through the refracting members 23 and 24 at positions 90° of rotation apart. Assume that "A" represents the zero position, then "B" and "D" represent the 90° and 270° positions, and "C" represents the 180° position. When the refracting members are in the "A" position, the beam of light is displaced in the first direction by the member 23 in the manner disclosed by the full line. In the "B" and "D" position, the beam is transmitted without displacement in the first direction, since the vertical sections in these positions are perpendicular to the beam. This is disclosed by the dot-dash line. In the "C" position, the beam is displaced in the first direction as shown by the dotted line. In each of these positions, the beam is reflected by the prisms 25 and 26 on to the member 24. The angles of incidence at which the reflected displaced beam meets the member 24 in each of the positions are of equal magnitude but of opposite sign, so that the original displacement in the first direction is counteracted. In a similar manner, the original displacement in the first direction at intermediate points of rotation is also counteracted. In Fig. 2 are diagrammatically disclosed superimposed vertical sections of the members 23 and 24 at positions "B" and "D". The sections at positions "A" and "C" are not disclosed, as they are perpendicular to the beam and have no effect upon it. In position "B", the entering beam is displaced in the second direction by the member 23 as shown, after which it is reflected by the prisms 25 and 26 to the member 24. In position "D", the entering beam is also displaced in the second direction by the member 23 as shown and is reflected by the prisms 25 and 26 to the member 24. The angles of inclination at which a beam displaced in the second direction meets the members 23 and 24 are of equal magnitude and the same sign, so that the displacement in the second direction accomplished by the refracting member 23 is doubled by the refracting member 24. At points intermediate the positions shown, the same situation results, so that at every position the refracting member 24 doubles the displacement effected by the member 23 in the second direction. As a result, the emergent beam is caused to traverse back and forth along a horizontal straight path.

A succession of beams traversing a straight path in the same direction may be produced by means of the apparatus diagrammatically disclosed in Fig. 3. In this apparatus, a plurality of segmental refracting members 33 and 34 are mounted upon a shaft 32 at the same inclination thereto. Reflecting prisms 35 and 36 are provided to reflect a beam of light traversing one of these members back to meet the other of said members. A beam of light projected upon the member 33 parallel to the axis of shaft 32 from a source of light 37 is acted upon in the same manner as above described. It is displaced in each of the two said directions, but, because of the fact that the beam is intercepted by the refracting member 33 during only a portion of its rotation, the beam is caused to traverse a path which is either a semicircle or less according to the number of segments used. The beam is reflected by the prisms 35 and 36 and directed against the member 34. Because of the relationship of the members 33 and 34, the displacement accompanied by the member 33 in the first of said directions is counteracted by member 34, whereas the displacement accomplished by the member 33 in the second direction is doubled by the member 34. As the member 33 passes out of the range of the beam, the member 34 enters the range of the beam and each member repeats the effect previously accomplished by the other. The entering beam is thus converted into a succession of beams moving horizontally along a straight path in the same direction.

With this apparatus, the displacement of the emergent beam is not uniform for each degree of rotation of the refracting members. Instead, this displacement varies in accordance with the sine of the angle of rotation from a zero point at which the angle of incidence in the second direction is zero. The displacement per degree is greater near the middle of the path than near the ends thereof. Any even number of segmental refracting members may be utilized and the same result obtained except that an increase in the number of refracting members will cause a decrease in the length of the path traversed by the emergent beam, as the displacement in the second direction accomplished by each member will be less because of the fact that it will be in the path of the light beam for a shorter portion of its rotation with an increase in the number of the refracting members.

The variation in the displacement per degree of rotation may be so compensated that substantially uniform displacement per degree of rotation may be obtained over a limited range symmetrically disposed with reference to the position of the members for zero displacement in the second direction. This is accomplished by additionally displacing the beam in said second direction by means of an apparatus in which the displacement per degree of rotation varies oppositely to the displacement accomplished by the above-described apparatus.

An apparatus which will accomplish this action is diagrammatically disclosed in Fig. 4. This apparatus, like the one above described, will convert a beam of light into a succession of beams traversing a straight path in one direction. This apparatus is composed of four parallel-faced light-refracting members 40, each arranged parallel to one of the others and perpendicular to the other two. These members are supported to rotate about an axis 41 symmetrically arranged with respect to the members. 42 is a source of light from which a beam of light is projected perpendicular to the axis 41 and which will be intercepted by each member 40 during 90° of revolution about the axis. The beam will be displaced in but one direction, as the angle of incidence is changed in one plane only. This displacement is shown by the full, dot-dash and dotted lines representing the displacements accomplished by one of the refracting members in the full, dot-dash and dotted line positions. The displaced beam meets the opposite member 40 at the same angle of inclination so that it is further displaced in the same direction an amount equal to the original displacement. By this apparatus, a stationary beam of light is converted into a succession of beams moving along a straight path in one direction. The displacement per degree of rotation is not uniform, but varies according to the tangent of the angle of rotation from a position at which the angle of incidence is zero and there is no displacement. The displacement per degree of rotation is therefore greater near the ends of the path than at the central portion thereof.

Applicant has discovered that the two types of apparatus above described may be combined to convert a stationary beam of light into a succession of beams moving along a straight path, so that the displacement per degree of rotation is substantially uniform over a limited range.

The refracting members must be so correlated that the combined displacements accomplished by them at any degree of rotation bears a fixed ratio to the combined displacements at every other degree of rotation within the prescribed limit. Moreover, the refracting members must be so rotated that they always bear a definite predetermined relationship to each other. This precludes mounting them upon separated shafts because gears, belts and the like would permit sufficient variation in their relationship to prevent obtaining the desired uniform displacement. Applicant has determined the proportionate displacement which must be accomplished by each type of apparatus in order to obtain uniform displacement. He has accomplished this by reference to curves in which the numerical values of the sines and tangents of angles up to 35° are plotted as ordinates with the abscissae representing the degrees. Such curves are disclosed in Fig. 7. By multiplying the numerical value of each of the tangent curve ordinates and adding them to the sine curve ordinates, a straight line curve is obtained. For example, the numerical value of a sin 35° is .5736 and the numerical value of the tan 35° is .7002. If the numerical value of the tangent 35° be multiplied by .415, the result is .2906, which added to the numerical value of the sine gives .8642. The numerical value of sin 17½° is .3007 and that of the tan 17½° is .3153, which, if multiplied by .415, gives a product of .1308, which, when added to .3007, amounts to .4315, which is approximately one-half of .8642, varying therefrom only by .006. At intermediate points, it will be found that the same relationship prevails, so that the resultant curve is substantially a straight line. From this, it follows that the proportionate displacement to be accomplished by the sine apparatus must be $$\frac{5736}{8642}$$

of the total, and the proportionate displacement accomplished by the tangent apparatus must be $$\frac{2906}{8642}$$

of the total, or, in other words, the displacements accomplished by the sine and tangent apparatuses must be in the ratio of 2906 to 5736. Therefore, the refracting members of the sine apparatus and the refracting members of the tangent apparatus are preferably composed of a transparent material having the same index of refraction and having a proper ratio of thickness, so that the displacements accomplished by them are in the prescribed ratio.

Thirty-five degrees has been selected arbitrarily, as beyond this point the relationship which makes possible the obtaining of a resultant straight line curve does not exist. The same relationship, of course, exists from zero to minus 35°, so that the range over which uniform displacement per degree of rotataion may be obtained is 70°. Consequently, it is not practical to combine sine and tangent apparatuses of less than four refracting members, and it may be preferable to use not less than six, if it is desired to have no interval between the beams. With apparatuses having four refracting members, the displacement for the last ten degrees at each end of the path will not be uniform, and for this reason ten degrees at the end of each sine apparatus segment should be made opaque, with the result that there will be an interval equivalent to twenty degrees of rotation between successive beams. This will not be the case in apparatuses having six or more refracting members, as each set of refracting members will be operative through only sixty degrees of rotataion.

An apparatus embodying the principles above described is disclosed diagrammatically in Figs. 5 and 6, of which Fig. 5 is a vertical section and Fig. 6 is a bottom view. Upon the shaft 50 are mounted four segmental plano-parallel light-refracting members 51 at the same inclination thereto whereby a substantially funnel-shaped structure is obtained. Also mounted upon the shaft 50 and symmetrically arranged with respect thereto are four refracting members 52, each of which is perpendicular to two of the remaining members and parallel to the other. Each of the members 52 is so mounted that it intercepts the same angle as intercepted by one of the members 51. Reflecting prisms 55 and 56 are supported between the refracting members 51 and 52 so that a beam of light passing through one of the members 51 is reflected through two of the refracting members 52 and then directed to the refracting member 51 opposite the first-mentioned refracting member 51. 57 represents a source of light from which a beam is projected to one of the members 51 in a direction parallel to the axis of the shaft 50. Rotation of the apparatus will cause this beam to be displaced successively by the members 51 in each of two directions, so that it traverses successively a quarter circle in the same direction. The displaced beam is reflected by the prism 55 through two of the members 52. In passing through the members 52, its displacement in the second of said directions is increased, but its displacement in the first of said directions is unaffected. The second refracting member 51 counteracts the orignual displacement accomplished by the first plate 51 in the first of said directions, and doubles the displacement accomplished by the first plate 51 in the second of said directions. There is thus obtained a succession of beams of light traversing a straight path in one direction.

The displacement of this beam per degree of rotation may be made uniform over the 70° range of rotation above mentioned by a proper ratio of thickness between the refracting members 51 and 52. The manner in which the proper thickness of the refracting members is determined will be described in detail in connection with the description of the physical embodiment of the invention disclosed in Figs. 8, 9 and 10.

With such an apparatus as above described in which the thickness of the refracting members is properly proportioned, a stationary beam of light may be converted into a succession of beams of light traversing a straight path in one direction at a uniform rate of speed by causing the shaft upon which the refracting members are mounted to rotate at a uniform speed. Likewise a succession of beams of light traversing a straight path in one direction at a uniform speed may be converted into a steady beam of light. In this latter instance the moving beam of light when projected upon the first refracting member 51 has its displacement in the direction of its travel decreased and is displaced in a direction at right angles to its direction of travel so that it is caused to traverse a curved path. In passing through the two members 52 its displacement in the first direction is again decreased without change in its displacement in the second direction so that it is caused to traverse a path which is a portion of a circle. The displacement accomplished by the second member 51 reduces to zero the displacement in the first direction and counteracts the displacement in the second direction so that the emergent beam is stationary.

A cinematograph film viewing apparatus embodying the principles above set forth is disclosed in Figs. 8, 9 and 10. 60 designates the base of the device to which is attached a bridge member 61. 62 is a carrier rotatably mounted between the bridge 61 and the base 60. The upper end of the member 62 terminates in a shaft 63 upon which is mounted a gear 64. The lower part of the carrier comprises a plate 65 supported by a shaft 66 mounted in suitable bearings. Four light refracting members 67 having parallel faces are mounted in suitable pockets provided in the carrier 62, each member being arranged at the same inclination to the axis of the carrier. Four other light refracting members 68 having parallel faces are supported from the carrier 62 and are symmetrically disposed about the axis thereof, each member being perpendicular to two of the others and parallel to the remaining one. Each plate 68 is so arranged that it intercepts the same arc as is intercepted by one of the members 67. The plano-parallel refracting members 67 and 68 both being rigidly mounted upon the carrier 62 bear the same relationship to each other at all times. Totally reflecting prisms 69 and 70 are mounted on suitable pedestals between the refracting members 67 and 68 so that a beam of light traversing one of the refracting members 67 in a direction parallel to the axis of the carrier 62 is reflected through two members 68 and onto another member 67.

In the bridge 61 is provided an aperture 71 and means are provided to move a cinematograph film across this aperture. This means comprises a shaft 72 mounted in bearings 73 and provided with a gear 74 meshing with the gear 64 on the shaft 63. Mounted on shaft 72 is a wheel 72' having teeth arranged to fit in holes provided on the sides of the films by means of which the latter may be advanced. The ratio of the gears 64 and 74 is such that the film is advanced four pictures for each rotation of the carrier 62. The aperture 71 is of the same width as the pictures on the film and is of a length equal to two pictures. A source of light 75 is provided for illuminating the film and between the source and the film there may be interposed a glass plate for diffusing the light, if desired. A viewing aperture 76 is provided in the bridge 61 at a place diametrically opposite the aperture 71.

The plano-parallel refracting members 67 and 68 are so designed that over an arc of 70° they are effective to convert a stationary beam of light into a succession of beams of light moving in the same direction at a uniform rate of speed or to convert a succession of beams of light moving at a uniform rate of speed into a stationary beam. As each refracting member 67 is in the range of light transmitted from the source 75 through the aperture 71 over 90° of rotation, it is necessary to render each member opaque over approximately 10° at each end. This of course results in a dark period after each picture but this period is so short that it does not interfere with the continuity of projection more than is usual in standard practice. The thickness of the members 67 and 68 is determined as follows. Each picture while being projected is advanced a distance equal to its own height, which averages .74219″. Since each member 67 is effective only over 70° of rotation, the extent of travel of the film during the effective period of the refracting member will be seven-ninths of the total movement or .57726″. This amount of movement must be counteracted by displacement in order to produce a stationary beam. Since there are two sets of refracting members, the amount of displacement to be accomplished by each set will be .28863. The proportionate amount of this displacement to be accomplished by each member 67 and 68 is in the ratio of .57358 to .29059. The displacement accomplished by each plate 67 is therefore .19156″ and the displacement accomplished by each plate 68 equals .09716″. Knowing the extent of displacement to be accomplished by each of the refracting members, the thickness required may be calculated by well-known optical formulæ. Applicant has determined that, where the index of refraction is 1.549, the thickness of each plate 67 should be 1.0566″ and the thickness of each plate 68 should be .1965″. The variation in displacement per degree of rotation is less than 5/10000ths of an inch which error is too minute to be noticed by human eye.

The operation of this apparatus is as follows: A film is arranged to be drawn over the aperture 71 by means of the toothed wheel 72′, and the carrier 62 is rotated at a uniform rate of speed through the medium of the shaft 63 by suitable means not shown. A succession of uniformly moving pictures are thus projected on to the members 67 as they pass under the aperture 71. The feed of the film and the rotation of the carrier are so correlated that when a picture is in the middle of the aperture, it lies over the center of one of the members 67. Since the film is advanced four pictures for each rotation of the carrier 62, the picture will pass out of the aperture at the same time that the member 67 passes out of the range of light passing through the aperture. There are thus projected on to each member 67 a bundle of light beams defining an image moving in a straight path in the same direction at a uniform rate of speed. Each beam will be displaced in the manner above described by the refracting members 67 and 68 so that upon emerging from the second refracting plate 67, they have become stationary beams and the image defined by them is stationary. Thus in looking through the aperture 76, an observer will see a succession of stationary pictures momentarily presented. Unless means are provided to prevent it the observer will view the whole of one picture and portions of the pictures preceding and succeeding said picture. If desired, a suitable shield may be provided to restrict observation to the one picture.

While the invention has been disclosed as embodied in a cinematograph film viewing apparatus, it is evident that the same principles may be utilized in a projector for cinematograph films. In such instance the image emerging from the second refracting member 67 will be projected upon a screen in the usual manner. Moreover it is apparent that either a film-viewing apparatus or projector may be provided with more than four refracting members to a set so long as the number of refracting members of each set is even. With six or more refracting members in each set it will be unnecessary to render the ends of the members 67 opaque since their spread will be only 60° and will lie within the permissible 70° range. Of course, the feeding mechanism for the film will always be so geared that it will be advanced a number of pictures equal to the number of refracting members in each set.

It is, of course, understood that means other than those specifically disclosed for displacing a beam of light come within the contemplation of the invention and lie within the scope of the appended claims. Moreover it is apparent that the principles involved may be utilized in connection with a cinematograph camera or other apparatus where it is desirable or advantageous to effect displacement of a light beam. Such an optical apparatus is of equal utility in displacing a moving beam of light to compensate for the movement of the beam and thereby produce a stationary beam as in displacing a stationary beam of light to produce a moving beam.

What I claim as new and desire to secure by Letters Patent of the United States is:

1. An optical apparatus comprising rotatable plano-parallel light-refracting means so mounted as to displace a beam of light in a single direction proportionately to the sine of the angle of rotation of said means, rotatable plano-parallel light-refracting means so mounted as to displace a beam of light in a single direction proportionately to the tangent of the angle of rotation of said second means, means for synchronously rotating both of said refracting means and means for directing a beam of light through both of said refracting means, said refracting means being so correlated that the resultant displacement per degree of rotation of said means is substantially uniform at least over a limited range.

2. An optical apparatus comprising a rotatable shaft, a plurality of plano-parallel light-refracting members so mounted on said shaft as to displace by refraction a beam of light in a single direction proportionately to the sine of the angle of rotation of said shaft, a plurality of plano-parallel light-refracting members so supported from said shaft as to displace by refraction a beam of light in a single direction proportionately to the tangent of the angle of rotation of said shaft, and means for directing a beam of light first through one of said first-named members, next through two of said second-named members and lastly through another of said first-named members, said refracting members being so correlated that the resultant displacement per degree of rotation is substantially uniform at least over a limited range.

3. An optical apparatus comprising a rotatable shaft, a plurality of plano-parallel light-refracting members mounted on said shaft at the same inclination thereto, an equal number of plano-parallel light-refracting members supported from said shaft symmetrically with respect to the axis thereof and parallel thereto, and means for reflecting a beam of light emerging from one of the said first-named refracting members through two of the second-named refracting means, and means for reflecting a beam of light emerging from the second of said last-named refracting members through another of said first-named members.

4. An optical apparatus comprising a plurality of plano-parallel light-refracting members rotatable about an axis with respect to which each of said refracting members bears the same inclination, an equal number of plano-parallel light-refracting members rotatable about an axis with respect to which they are symmetrically disposed and parallel, means for synchronously rotating both sets of refracting members, and means for directing a beam of light first through one of said first-named members, next through two of said second-named members in succession, and lastly through another of said first-named members.

5. In combination, a rotatable shaft, a plurality of light-refracting members having parallel faces mounted on said shaft at the same inclination thereto, a like number of refracting members supported symmetrically about said axis with their faces parallel thereto, and a pair of total reflection prisms interposed between said sets of refracting members to reflect a beam of light emerging from one of said first set of refracting members through two of said second set of refracting members to a second of said first set of refracting members.

6. In combination, a rotatable shaft, a plurality of light-refracting members having parallel faces mounted on said shaft at the same inclination thereto, a like number of refracting members supported symmetrically about said axis with their faces parallel thereto, and a pair of total reflection prisms interposed between said sets of refracting members to reflect a beam of light emerging from one of said first set of refracting members through two of said second set of refracting members to a second of said first set of refracting members, said refracting members being so correlated that the resultant displacement of a beam of light projected upon each of said members successively in a direction parallel to the axis is uniform per degree of rotation of the axis thereof over a limited range.

7. An optical apparatus comprising rotatable plano-parallel refracting means so mounted as to displace a beam of light proportionately to the sine of the angle of rotation of said means, rotatable plano-parallel refracting means so mounted as to displace a beam of light proportionately to the tangent of the angle of rotation of said second means, means for synchronously rotating both of said light displacing means and means for directing a beam of light from one of said light displacing means to the other of said light displacing means, said light displacing means being so correlated that the resultant displacement per degree of rotation of said means is substantially uniform at least over a limited range.

8. An optical apparatus comprising a shaft, plano-parallel refracting means so mounted on said shaft as to displace a beam of light proportionately to the sine of the angle of rotation of said shaft, plano-parallel refracting means so mounted on said shaft as to displace a beam of light proportionately to the tangent of the angle of rotation of said second means, means for synchronously rotating both of said light displacing means and means for directing a beam of light from each of said light displacing means to the other of said light displacing means.

9. In an optical apparatus the combination of a plurality of plano-parallel refracting members rotatable about an axis inclined thereto for displacing a beam of light proportionally to the sine of the angle of rotation of said members, a corresponding number of plano-parallel refracting members rotatable about an axis parallel to the faces thereof for displacing a beam of light along a straight path proportionally to the tangent of the angle of rotation of said last named refracting members, means for causing both sets of refracting members to rotate in unison, means for directing a beam of light to be twice displaced by each set of said plano-parallel refracting members, said refracting members being so correlated that for a limited range the resultant displacement per degree of rotation is practically uniform.

In testimony whereof, I have signed my name to this specification.

JACOB F. LEVENTHAL.